June 21, 1960 W. E. RIPPER 2,941,753
AERIAL SPRAYING OF LAND OR CROPS
Filed Sept. 3, 1954 14 Sheets-Sheet 1

INVENTOR.
Walter Eugene Ripper.
BY
Thiess, Olsen, Mecklenburger,
van Holst, & Coltman ATTORNEYS.

June 21, 1960 W. E. RIPPER 2,941,753
AERIAL SPRAYING OF LAND OR CROPS
Filed Sept. 3, 1954 14 Sheets-Sheet 3

INVENTOR.
Walter Eugene Ripper.
BY
Thiess, Olsen, Mecklenburger,
von Holst, & Coltman. ATTORNEYS.

June 21, 1960    W. E. RIPPER    2,941,753
AERIAL SPRAYING OF LAND OR CROPS
Filed Sept. 3, 1954    14 Sheets-Sheet 4
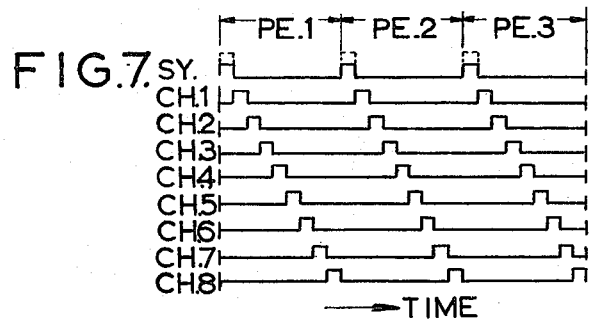
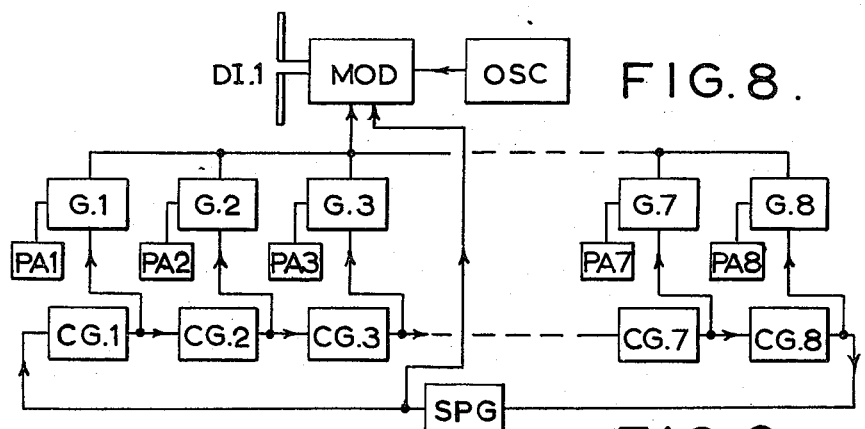
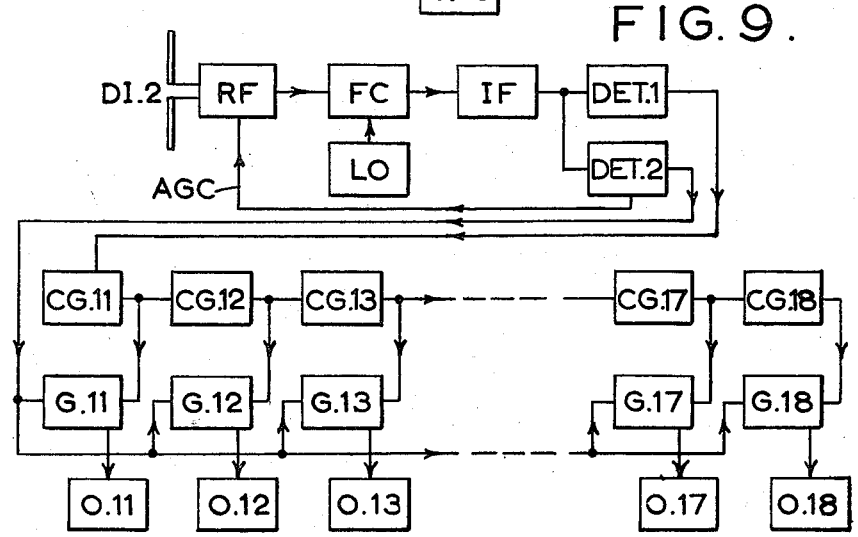
INVENTOR.
Walter Eugene Ripper.
BY Thiess, Olsen, Mecklenburger, von Holst, & Coltman ATTORNEYS.

June 21, 1960 W. E. RIPPER 2,941,753
AERIAL SPRAYING OF LAND OR CROPS
Filed Sept. 3, 1954 14 Sheets-Sheet 5

INVENTOR.
Walter Eugene Ripper.
BY
ATTORNEYS.

June 21, 1960    W. E. RIPPER    2,941,753
AERIAL SPRAYING OF LAND OR CROPS
Filed Sept. 3, 1954    14 Sheets-Sheet 6

INVENTOR.
Walter Eugene Ripper.
BY
Thiess, Olson, Mecklenburger,
van Holst, & Coltman ATTORNEYS.

June 21, 1960　　　W. E. RIPPER　　　2,941,753
AERIAL SPRAYING OF LAND OR CROPS
Filed Sept. 3, 1954　　　　　　　　　　　　14 Sheets-Sheet 7

INVENTOR.
Walter Eugene Ripper.
BY
Thiess, Olsen, Mecklenburger,
von Holst, & Coltman ATTORNEYS.

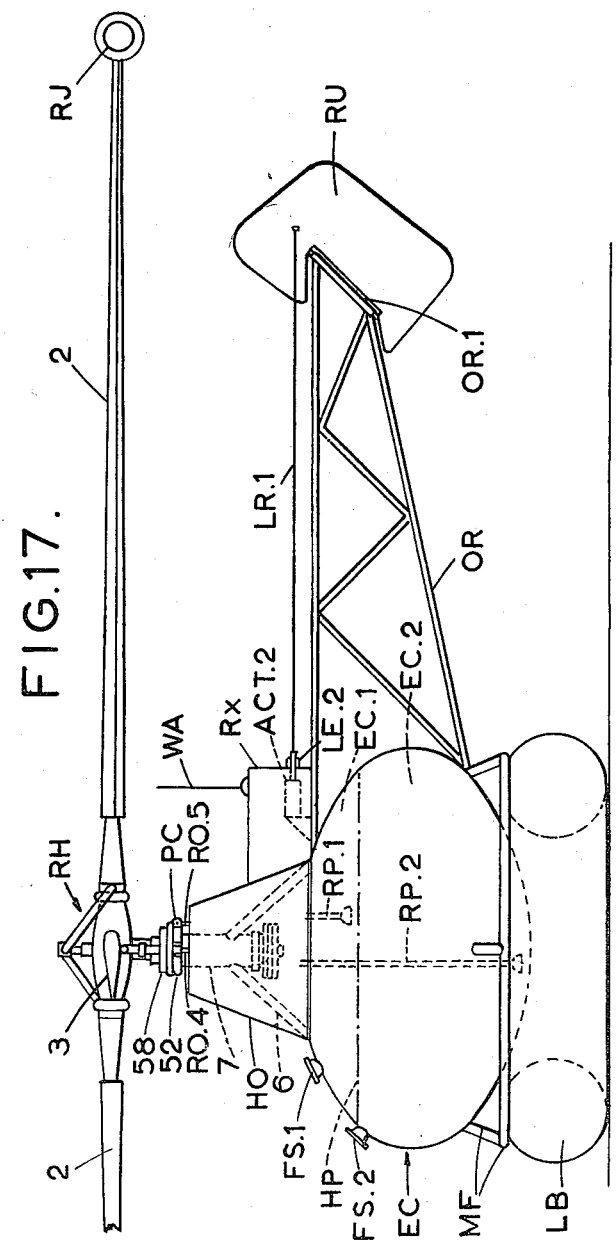

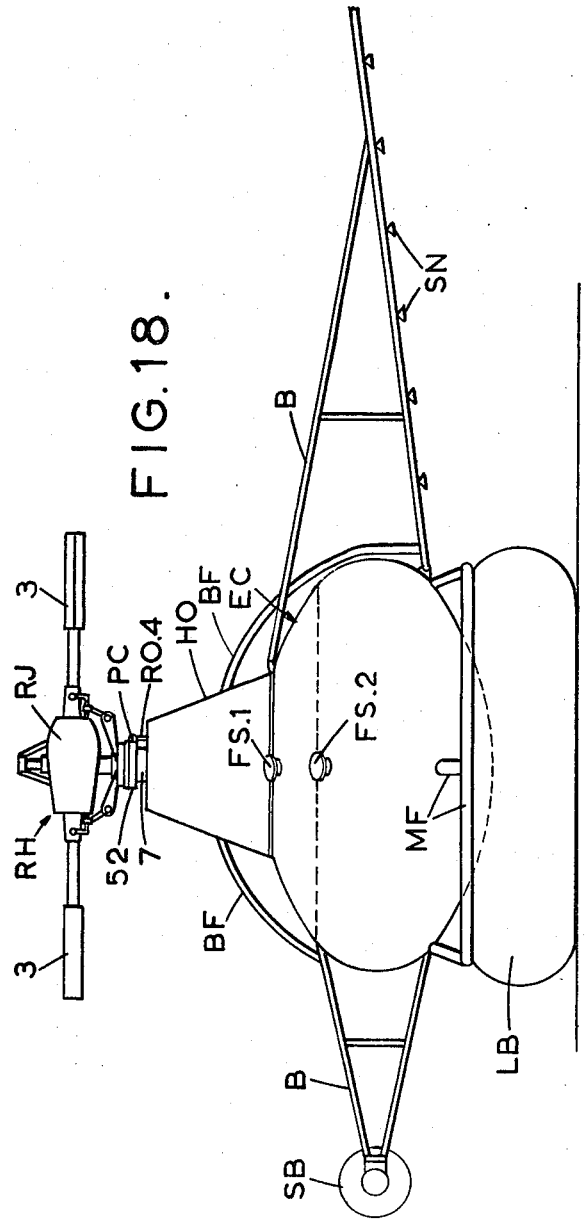

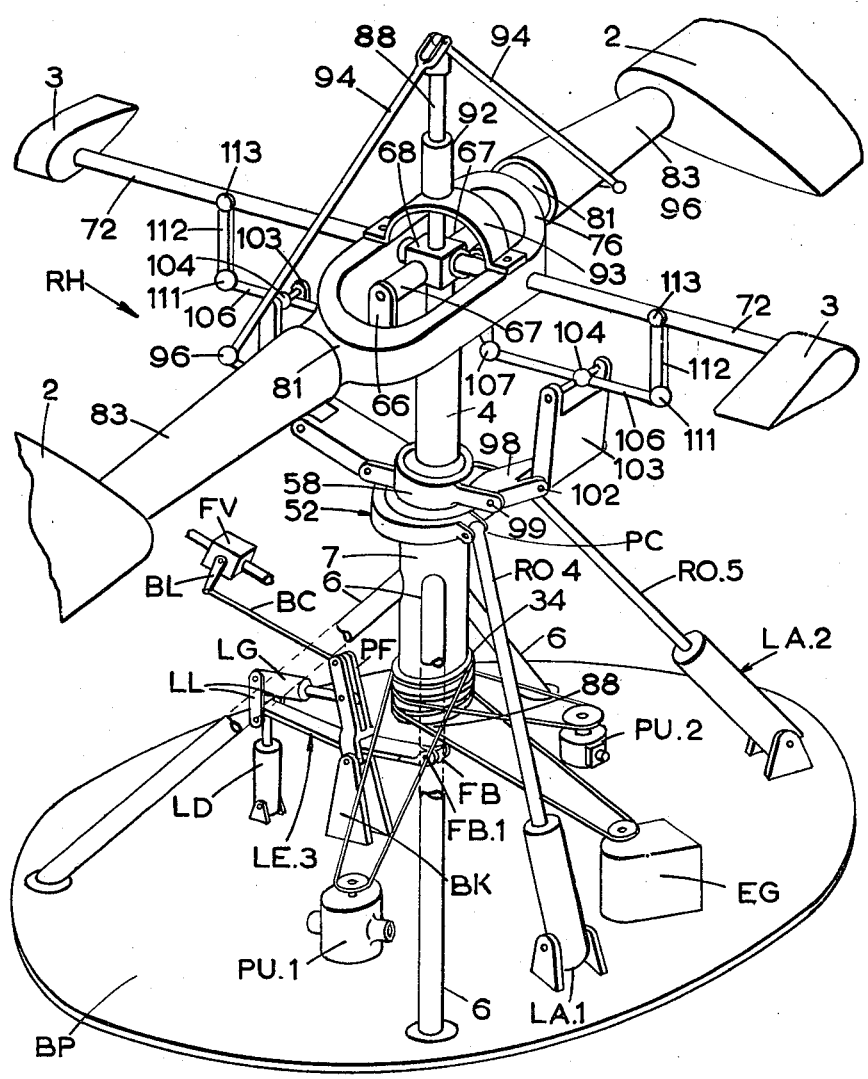

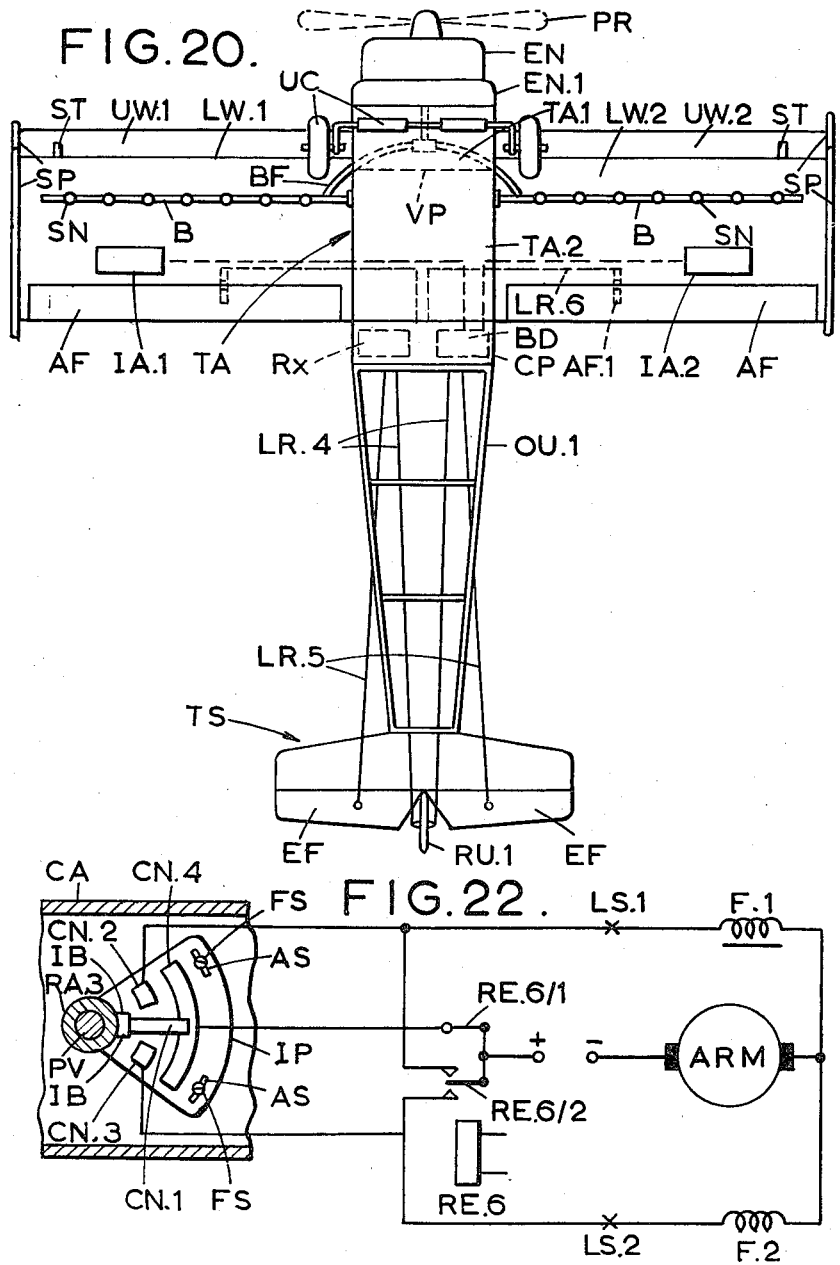

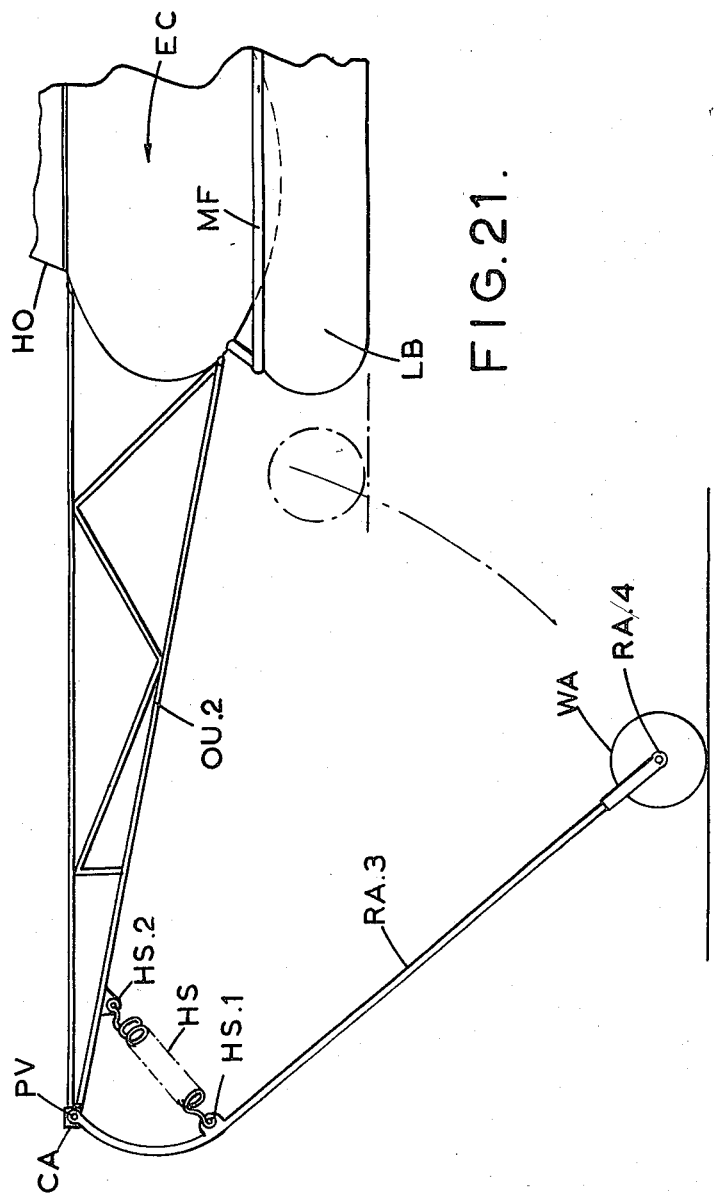

June 21, 1960  W. E. RIPPER  2,941,753
AERIAL SPRAYING OF LAND OR CROPS
Filed Sept. 3, 1954  14 Sheets-Sheet 13
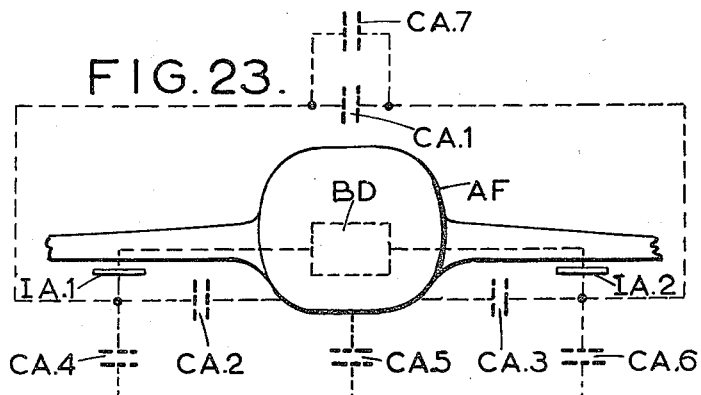
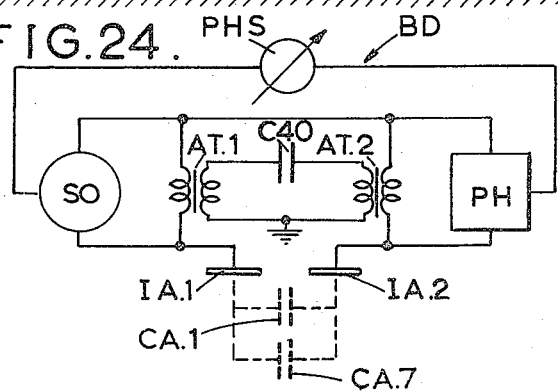
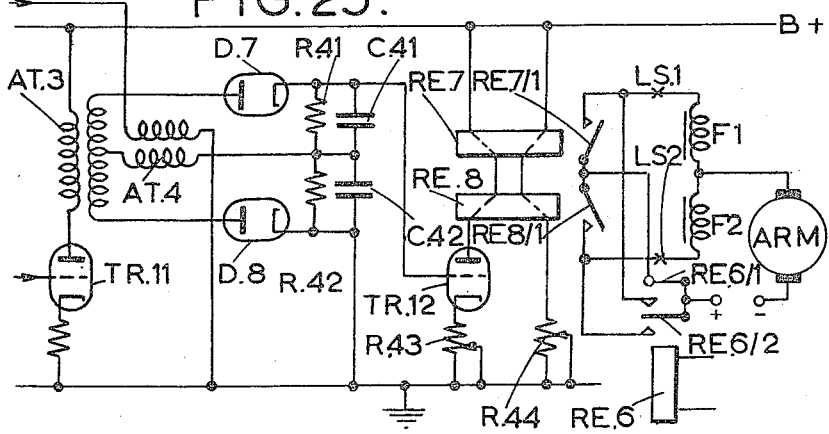
INVENTOR.
Walter Eugene Ripper.
BY
ATTORNEYS.

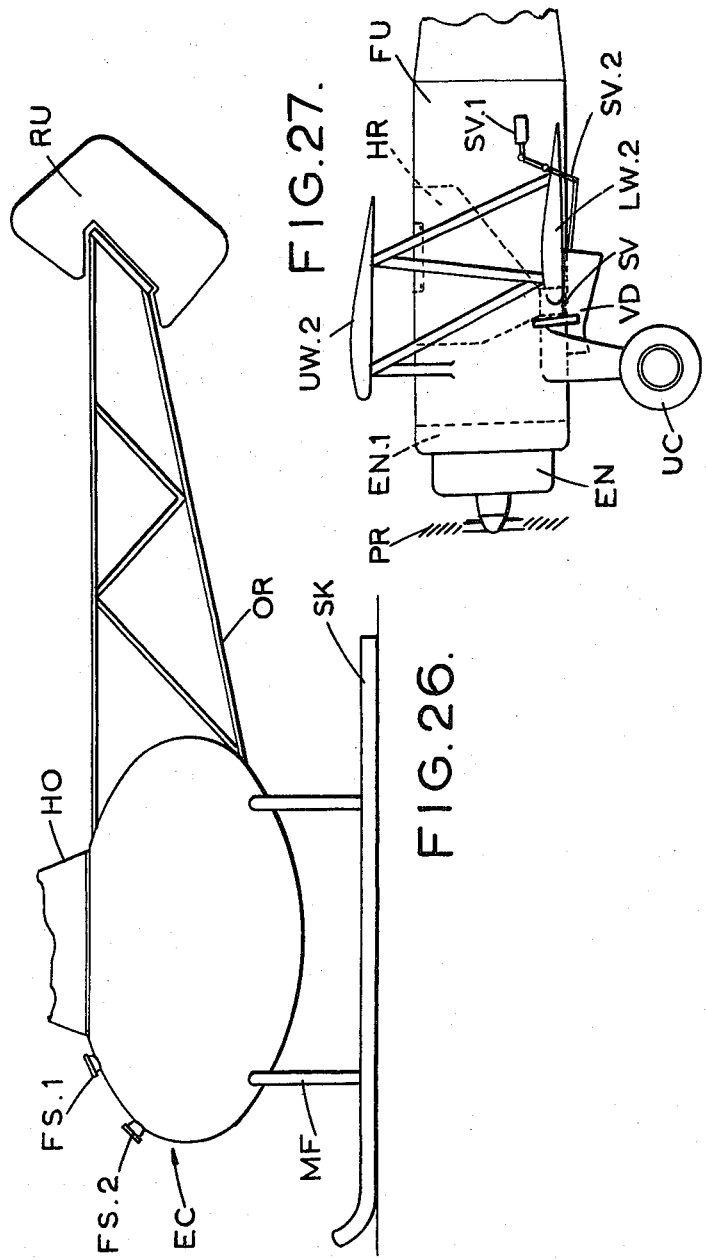

United States Patent Office 2,941,753
Patented June 21, 1960

2,941,753

AERIAL SPRAYING OF LAND OR CROPS

Walter Eugene Ripper, 17 Barton Road, Cambridge, England

Filed Sept. 3, 1954, Ser. No. 454,108

5 Claims. (Cl. 244—77)

This invention relates to the aerial spraying and treatment of land, swamps, watersurfaces or crops for agricultural, horticultural and arboricultural purposes such as the combatting of weeds or pests. The term "spraying" is used generically throughout this specification to include not only spraying but also seeding, dusting, gassing, fogging, spreading of fertilizer in solid, powdered and granular form and the like. The term "spray" and "spray medium" are used herein to include liquid, dust, seeds, granular formations, aerosol, gas and vapour.

Many of the spray media employed in the spraying of land or crops are highly toxic or otherwise dangerous to health and adequate precautions should be taken to provide protection for the personnel involved in the spraying operation. This is by no means easy in the case of aerial spraying as at present practised, using aircraft of the fixed-wing or helicopter type fitted with spray-dispensers such as spray-bars, spray-brushes or venturi-spreaders, since the aircraft must be maintained at a low height (as low as 1 metre) throughout spraying and it is difficult adequately to protect the pilot of such a low-flying aircraft from the effects of the spray. Moreover, if the aircraft should crash the breakage of the container or containers of the spray medium could have dangerous results for the pilot.

Another problem in aerial spraying is pilot-fatigue caused by low flying for prolonged periods.

The main object of the invention is to overcome the aforesaid disadvantages of the present manner of aerial spraying by the provision of pilotless, powered aircraft subject to radio-control from a remote control-point on the ground whereby all or a number of the operations hitherto performed by a pilot, such as maintenance of correct course and on/off control of the spray medium, are carried out by a remote operator or automatically effected under his supervision.

This and ancillary objects, such as the provision of improved aircraft and of automatic controls not normally requiring an operator, will be better understood from the following description taken in conjunction with the accompanying drawings, wherein:

Figure 7 is a timing diagram explaining the principle of a pulse-multiplex radio-control system.

Figure 8 is a block diagram of a transmitter for pulse-multiplex radio-control employing pulse-amplitude modulation.

Figure 9 is a block diagram of an aircraft receiver for use with the transmitter of Figure 8.

Figures 17 and 18 are elevational views, from the side and front respectively, of an improved helicopter for use in carrying out my invention.

Figure 19 is a perspective view of the rotor head of the helicopter shown in Figures 17 and 18.

Figure 20 is an inverted plan of an improved fixed-wing aircraft (a biplane) for use in carrying out my invention.

Figure 21 illustrates a modification of the helicopter shown in Figures 17 and 18 to assist in maintenance of correct flying height.

Figure 22 is a circuit diagram showing the electrical controls associated with the height-maintenance device illustrated in Figure 21.

Figure 23 is a diagram explanatory of the principle of a capacitance altimeter.

Figure 24 is a diagram of a bridge-circuit for a capacitance altimeter.

Figure 25 is a circuit showing how the bridge of Figure 24 can be applied to maintenance of aircraft height.

Figure 26 is an elevational view showing a modification of the helicopter of Figures 17 and 18.

Figure 27 is an elevational view showing a modification of the fixed-wing aircraft of Figure 20.

Figure 1:
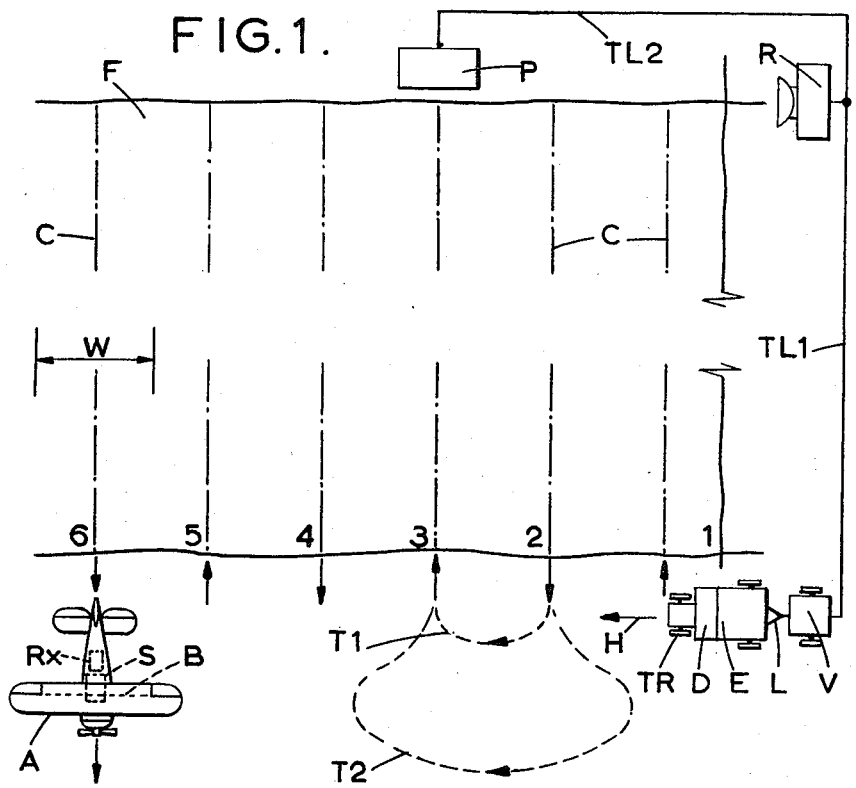
Figure 1 is a diagram showing how a radio-controlled aircraft may be employed to spray a field in a series of contiguous, parallel belts by flying parallel courses traversed successively in opposite directions.

Referring to Figure 1 of the accompanying drawings, it is a well-known practice to conduct aerial-spraying of a field F by causing an aircraft A to traverse a series of parallel courses over the field as shown in chain-dotted lines C. These course-lines are spaced apart by a distance corresponding to the effective width W of the belt of spray deposited by the aircraft during its flight over the field. It is generally preferable, but by no means essential, that the successive, adjacent courses should be traversed in opposite directions, as shown by the vertical arrows in the figure, the aircraft turning at opposite boundaries of the field as shown in dotted lines at T1 or T2; if a helicopter is employed a tight turn as at T1 is possible but a fixed-wing aircraft (as shown) must make a wider turn as at T2.

The aircraft A carries inter alia a container S for the spray-medium and this is connected to spray-dispensers here shown as booms B fitted with spray-nozzles or rotary spray-brushes, whereby a substantially uniform belt of spray of width W is formed. The spray-medium is frequently of a character dangerous to health and since aircraft A must fly the courses C at a low height (e.g. 1 metre) it is difficult to give adequate protection to the pilot when, as hitherto, aircraft A carries a pilot for controlling its height and course, timing the supply of spray, and so on. The danger is enhanced in the event of a crash. Moreover, the requirement of accuracy in height- and course-maintenance under the conditions involved imposes a considerable strain on the pilot.

According to the invention I obviate these disadvantages of the known manner of aerial spraying by employing a pilotless, powered aircraft and providing radio-control thereof from a remote point on the ground whereby requisite control operations are performed or supervised by a remote operator or operators. For instance, I provide a truck TR fitted with reserve supply-containers D, E for aircraft-fuel and spray-medium respectively and linked at L to a trailer-vehicle V carrying radio-transmitting equipment and forming the remote control-point aforesaid. I may advantageously use a pulse-multiplex system of radio control and suitable circuits for this are given later, together with details of actuating mechanisms and improved aircraft designs. It suffices to say for the moment that control operations normally performed by the pilot are carried out by conventional electric relays and/or aircraft actuators (the latter incorporating electric drive-motors and providing either a rotary movement or a linear thrust-movement in well-known manner), which relays and actuators can be remotely-controlled by transmission of radio-signals under control of an operator from V to a radio receiver Rx on the aircraft. The truck TR with the control trailer V advances along one boundary of the field as shown by arrow H as spraying proceeds to facilitate the work of the operator in charge of the radio-control equipment and to be available whenever the aircraft is landed for replenishment of its fuel and spray supplies from reserve containers D, E.

Since the aircraft will be in sight at all times from V the operator there will have no difficulty in exercising remote-control of the course except possibly for the ascertainment of the moment when the aircraft reaches the far boundary of the field, when, of course, the spray should be temporarily stopped and a turn initiated in readiness for the next course and the moment of return when the spray is to be turned on again. A watchman may be stationed at the far boundary to wave a flag or otherwise signal the arrival of the aircraft at the boundary to the operator at V but preferable alternatives, to be employed either singly or jointly as desired, are the provision of a second remote-control point P having radio-equipment transmitting the same control-signals on the same wavelength as the equipment at V and the provision of a radar set R having its line of shoot directed along the far boundary.

When the additional control-point P is provided, a second operator is stationed at P and is responsible for on/off control of the spray and turns between courses at the boundary remote from V. By utilising equipment at P which operates on the same wavelength as that at V and which sends out the same control-signals there is no need for additional complication of airborne equipment. If the radar set R is not utilised, P may be placed at the position occupied by R in the drawing.

The radar set R may be of the range-measuring type but is preferably a simple MTI (moving-target indicator) since this obviates difficulties due to echo-clutter from fixed objects such as trees and provides all the information required for control purposes (namely, the time of arrival of a moving target—the aircraft—on a fixed line of shoot) in a relatively simple fashion. An operator may be stationed at R to watch the radar display and signal to V and/or P but it is advantageous to have R unattended and to repeat the output signals of the set at V and/or P, for instance over transmission lines TL1, TL2. Radar sets of the range-measuring and MTI types and radar-repeater links are described in various published texts, such as the M.I.T. Radiation Laboratory Series, and it is thought to be unnecessary to enter into further detail in this description.

Figures 2, 3:
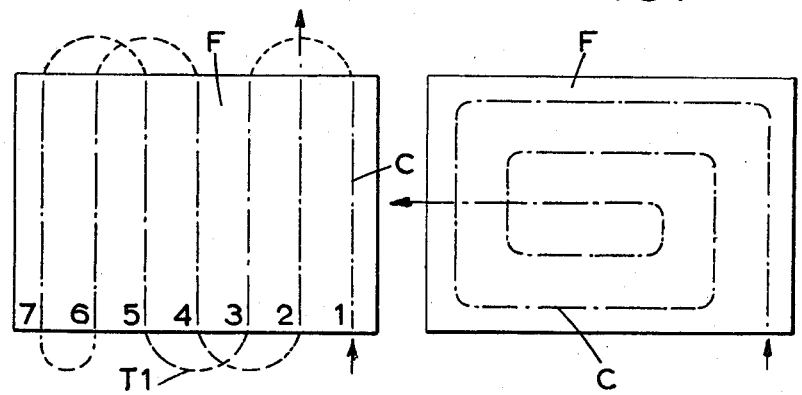
Figure 2 is a diagram showing a modification of the flight-pattern illustrated in Figure 1 but still employing parallel courses.
Figure 3 is a further flight-pattern diagram.

Examples of further forms of flight-pattern that may be executed under remote radio-control are shown in Figs. 2 and 3. In Figure 2 parallel courses are followed across the field but instead of the parallel courses being traversed in the succession 1, 2, 3 ... as in Figure 1 (proceeding from right to left) the aircraft first goes over courses 1, 3, 5, 7 (proceeding from right to left) and then along the remaining courses 6, 4, 2 (proceeding from left to right). Figure 3 shows a flight-pattern that may be described as a distorted spiral; the sharp turns shown are somewhat unrealistic and in practice this type of pattern tends to be a nearer approximation to a true spiral than is illustrated because of the curvature of the aircraft-circuits.

In addition to remote-control from control points such as V and P under the command of an operator it is possible to provide automatic means on the aircraft which perform certain automatic-pilot or other functions for maintenance of course, height and the like. Such means should be subject to overriding control from the operator's transmitting equipment so that he can supervise their operation or, in an emergency, render them inoperative.

Figure 4:
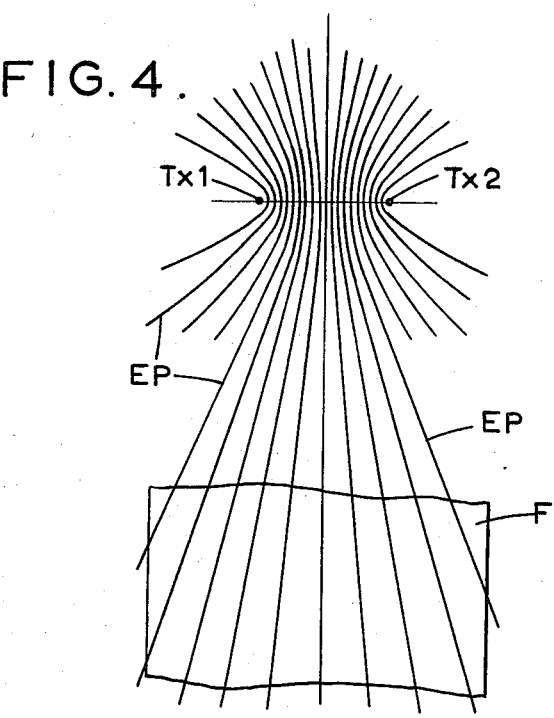
Figure 4 illustrates the application of a hyperbolic navigational aid to maintenance of aircraft-course.

For instance, automatic course-maintenance may be achieved by equipping the aircraft with additional radio-receiving equipment responsive to signals from a pair of radio transmitters forming a hyperbolic navigational aid. Referring to Figure 4, two transmitters Tx. 1 and Tx. 2 are provisionally assumed for explanatory purposes to radiate simultaneously and in synchronism the same radio-frequency wave in C.W. form. Such a pair of transmitters is said to form a hyperbolic navigational aid because the loci of points which have equal path-differences to the transmitters (and hence receive therefrom waves having a constant phase-difference) form a series of confocal hyperbolae with their foci at the transmitters. Some of these loci of equal path-difference are shown at EP in Figure 4; in the usual employment of hyperbolic aids these loci are printed on a navigational chart to form lines of position and in, say, an aircraft the signals from the transmitters are picked up and compared in phase to ascertain the appropriate line on the chart corresponding to the azimuthal position of the aircraft. For a fix a second set of lines, intersecting the first-mentioned, must be derived from a second pair of transmitters. However, it is clear that a navigational aid of this type may also be employed to cause an aircraft to traverse a course set by such a line of constant phase-difference and this is the use to which I propose to put an aid of this character in carrying out my invention.

For a field small with respect to the coverage-area of such a radio aid and at a sufficient distance from the transmitters the lines EP traversing the field are, for all practical purposes, straight (see Figure 4). Moreover, the base-line connecting the two transmitters may be located with respect to the field so that selected loci EP are substantially parallel lines coincident for all practical purposes with the desired courses such as C in Figure 1. Since it is impossible to draw the field F, the base-line between Tx. 1 and Tx. 2, and the coverage-area of the said pair to the same scale and in a legible manner in a figure of size permissible in a patent drawing such as Figure 4 this illustration exaggerates the divergence of the lines EP.

It was provisionally assumed above for the sake of introductory explanation that Tx. 1 and Tx. 2 radiate synchronously the same unmodulated wave. In practice, of course, some differentiation must be provided between them in order that the aircraft receiver may distinguish one from the other for phase-comparison purposes; thus in the Decca Navigator System described by W. J. O'Brien in volume 7 of The Journal of the British Institution of Radio Engineers, pages 215–246, October 1947, the two transmitters radiate unmodulated waves of different frequencies which are harmonically related to a common fundamental frequency.

In the aircraft receiver (Figure 5) of the Decca Navigator System the two waves picked up by antenna AN from Tx. 1 and Tx. 2 and having frequencies of, say, 80 kc./s. and 60 kc./s. are first amplified separately in amplifiers AMP.1 and AMP.2 and then applied to frequency multipliers FM.1 and FM.2 respectively whereby they are brought to the same frequency. For instance, multiplier FM.1 may be a tripler and FM.2 a quadrupler in the case of waves of 80 and 60 kc./s., the final common frequency then being 240 kc./s. Signals at the common frequency are developed at the outputs of the two receiver channels across, firstly, a transformer composed of a primary winding PW.1 and a secondary SW.1 and, secondly, a double-tuned transformer comprising a primary PW.2 and secondary SW.2. The secondary SW.1 is shunted by capacitor C.1 and is centre-tapped to form two coils L.1, L.2. The inductors PW.2 and SW.2 are shunted by capacitors C.2, C.3 and appropriate coupling and resonance conditions are established so that the voltages across PW.2 and SW.2 are in phase quadrature and equal in amplitude, whereas the voltages across the coils L.1, and L.2 are, of course, in phase opposition and equal in amplitude.

Figure 5:
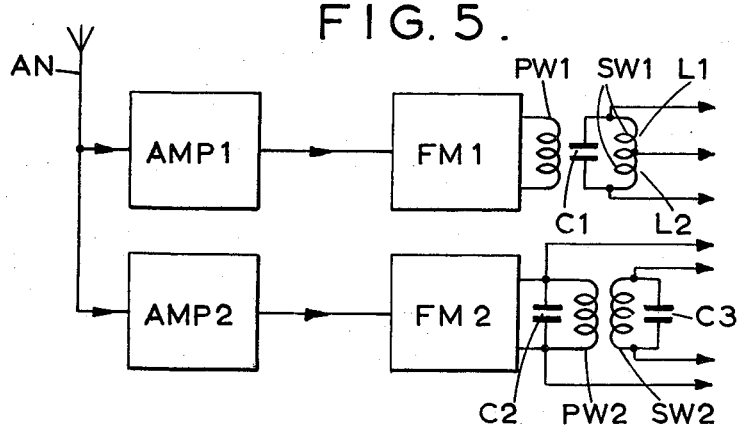
Figure 5 shows the essential features of an airborne receiver for a particular type of hyperbolic navigational aid.
Figure 6:
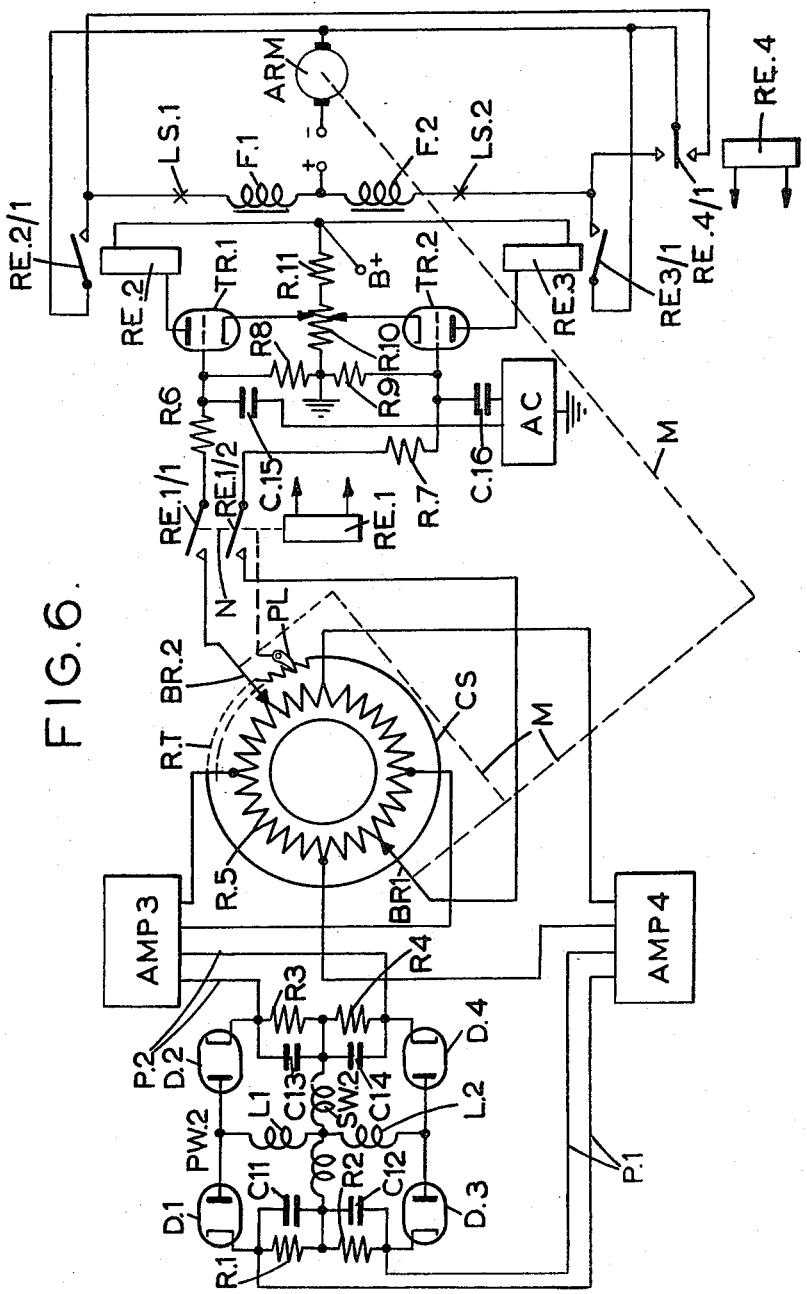
Figure 6 is a circuit diagram of apparatus operated from the receiver of Figure 5 to achieve course-maintenance.

L.1, L.2, PW.2 and SW.2 are shown again in Figure 6, where they are arranged in star-fashion and connected to four diodes D.1, D.2, D.3 and D.4 so that each diode receives the sum of two signals, one from one receiver channel and the other from the second channel. The capacitors C.1, C.2 and C.3 are omitted from Figure 6 to simplify the drawing. Each diode has a load resistor R.1, R.2, R.3 and R.4 respectively shunted by capacitor C.11, C.12, C.13 and C.14 respectively. O'Brien (loc. cit.) explains clearly how, with this circuit, the pairs of load resistors R.1, R.2 and R.3, develop voltages which are proportional to the sine and cosine of the angle of phase-difference between the comparison signals derived by amplification and multiplication in the manner explained with reference to Figure 5. Up to this point the receiver follows the O'Brien disclosure, to which reference may be made for details that are unnecessary for an understanding of the purpose to which I put the circuit and to which I now revert.

Instead of employing the sine and cosine voltages to drive an indicator as in the Decca receiver disclosed by O'Brien I employ them to control the rudder of a spraying aircraft so that the aircraft follows in succession each of a series of lines of constant phase-difference (EP in Figure 4) after having been brought into correct or approximately-correct position for each line in turn by operator-control from V and/or P. I first apply the sine and cosine voltages via pairs of conductors P.1, P.2 to D.C. amplifiers AMP.3 and AMP.4 which are of a well-known phase-reversing type so as to produce equal outputs in phase opposition. In other words, one produces what I may term a positive sine voltage and a negative sine voltage and the other positive and negative cosine voltages. These phase-opposed pairs are applied as shown to four cardinal points on a circular resistor R.5 of a form frequency used in computing circuits, such as fire-control computers; for instance, as indicated in conventional fashion the resistor R.5 may be an annular track on a flat, card-like support CS, forming a so-called resistance card or card resistor.

Brushes BR.1, BR.2 contacting the resistor R.5 at diametrically-opposed points thereof and mounted for joint rotation around the centre thereof are connected through make-contacts RE.1/1 and RE.1/2 of a relay RE.1 (assumed energised) and through grid resistors R.6, R.7 to the grids of triodes TR.1, TR.2. Relay RE.1 is subject to remote radio-control as hereinafter explained. These triodes are provided with leak-resistors R.8, R.9 connected to the grounded end of a chain of resistors R.10, R.11 placed across the anode-supply circuit of which the positive terminal is marked B+. The cathodes of the triodes are connected to tappings on resistor R.10. A source of alternating voltage (preferably a sawtooth voltage) is shown at A.C. and is connected to both grids via blocking capacitors C.15, C.16. The anode circuits of the triodes include relays RE.2, RE.3, whose make-contacts R.2/1 and RE.3/1 control the field-circuit of the motor of a rudder-actuator.

As already mentioned, I make use of conventional aircraft actuators and I have chosen one well-known form of actuator for illustration here and later in this specification comprising a series motor of the split-field type, i.e. with oppositely-poled field windings which may be brought into use alternatively, one for one direction of rotation of the armature and the other for the opposite direction. The armature is designated ARM and the two fields F.1, F.2. One armature brush (the left-hand brush in the drawings, Figure 6) is connected, as shown, to a point common to the two field windings via a D.C. source, the other brush being connected to both contact arms of the relay contacts RE.2/1 and RE.3/1. References LS.1 and LS.2 denote the limit-switches commonly provided in the field circuits of actuators of this kind to ensure against damage due to over-running. The brushes BR.1, BR.2 are mechanically coupled to the actuator so as to be driven thereby, the coupling being conventionally indicated by dotted lines at M.

When R.5 is supplied with the four voltages from AMP.3 and AMP.4 there is a voltage-distribution around the resistor exhibiting two null-points at two diametrically opposite points thereof. If the brushes BR.1, BR.2 are positioned at these null-points there is no alteration of the normal conditions of triodes TR.1, TR.2 which are normally biased by adjustment of the tappings on R.10 so that the voltage from source AC is not permitted to operate relays RE.2, RE.3. When, however, BR.1, BR.2 are off the null-points they receive voltages dependent upon the positional error and as a result thereof, the bias of either TR.1 or TR.2 (according to the sign of the error signal derived by the brushes from R.5) is partially counteracted and the associated anode relay receives operative pulses of current corresponding to the peaks of the voltage from AC, the triode acting as a Class C tube and delivering pulses of current which are longer in duration as the standing bias is increasingly counteracted. These pulses cause energisation of anode relay RE.2 or RE.3 and hence completion of the motor circuit through either RE.2/1 and F.1 or RE.3/1 and F.2 as the case may be. The actuator is thus driven in such sense as to bring BR.1 and BR.2 to the null-points. The mean value of the current in the motor circuit is, of course, determined by the duration of the pulses delivered by TR.1 or TR.2 to its relay. The frequency of the pulses is fixed by the frequency of source AC; it is not critical but is advantageously of the order of 50 cycles per second.

The aircraft rudder is thus controlled in accordance with the relative position of the brushes BR.1, BR.2 to cause the aircraft to follow a line (EP, Figure 4) of constant phase-difference, it being clear that it is the values of the sine and cosine of the difference-angle of the selected line that determine the positions of the null-points on R.5. Further provision must be made to permit the same control-action to be repeated after the aircraft has completed one course and has been brought to the commencing point of the next because with CS fixed the null-points change position around R.5 as the sine and cosine voltages change with phase-difference whereas the neutral position of the rudder should always have the same spatial or geometric relation to the diametric position of the null-points for each course. The provision made for this purpose is the addition of means to rotate the card CS intermittently so that for each course the null-points always occur at the correct diametric position in relation to the rudder. In Figure 6 I have shown the card CS provided at its outer edge with ratchet teeth RT engaged by a pawl PL. This pawl, as conventionally shown by dotted lines N, may be linked to the moving mechanism of relay RE.1 in which event RE.1 must be brought from the de-energised to the energised condition at the commencement of each course; at the same time as CS is advanced to the correct position for the new course the relay contacts correct BR.1 and BR.2 to the triodes TR.1 and TR.2. This simple arrangement is all that is necessary for a flight-pattern as in Figure 1 since it is immaterial whether the lines EP are traversed in one direction or the other.

It may be noted here that the spray-medium requires to be turned on at the commencement of a course over the field so that relay RE.1 must be energised by control from V or P simultaneously with the radio-controlled operation of an actuator driving the cock, slide-valve or other means controlling the delivery of the spray-medium from the supply container; on the other hand RE.1 requires to be kept energised until the end of the course, whereas the actuator for the said cock or equivalent will normally remain inoperative between starting and ending a course. This introduces some circuit complications that are not necessary since, as shown later, all the control actions at the beginning and end of the course can be performed by the cock-actuator. However, the relay is a possible expedient and has been included in Figure 6 for the sake of simplicity.

Radio-control of the rudder from V and/or P is necessary for the turns at the ends of courses and also in emergency. The operator renders the circuit of Figure 6 inoperative, with the exception of the rudder actuator, by de-energising RE.1 and controls a further relay RE.4 for rudder actuation. This relay is polarized and has a single pivoted contact-arm RE.4/1 capable of occupying three positions. In the neutral position shown the arm, which is connected to the right-hand brush of armature ARM, is ineffective and this is the position occupied when the automatic control of course is operative; in either of the other positions of the arm it engages a contact connected to a field coil of the motor and thus completes the motor circuit through one or other coil. A similar action may be obtained from a non-polarized relay as explained later.

Figure 7 is a time-diagram showing three periods PE.1, PE.2 and PE.3 of the pulse trains forming modulating-pulses for an eight-channel radio-control system of the pulse-multiplex type, together with a train of synchronizing pulses. The latter are shown at SY and the pulses of the individual channels are designated CH.1 to CH.8. The periodic time is thus occupied by nine pulses (which are all of the same duration) and control-information is transmitted in each channel by amplitude-control of the modulating pulses. All channel-pulses are here shown at their maximum value. It is necessary to be able at the receiver to distinguish the synchronising pulses from the channel-pulses and a convenient way of ensuring this is to give the synchronising pulses a greater value than the maximum value in the channels, as indicated by dotted lines in Figure 7. Thus if the maximum value of the SY pulses is equivalent to 100% modulation the maximum in any channel-modulation train may correspond to, say, 60 or 75% modulation. The pulse recurrence frequency is not critical but may be of the order of 10,000 cycles per second.

Figure 8 is a block-diagram of a transmitter for such a pulse-multiplex control system employing pulse-amplitude modulation. The equipment is the same in each channel of the transmitter except for the type of amplitude-control adapted, this varying according to the requirements at the receiver in the aircraft. Five only of the channel-equipments are shown. They all feed into a modulating-amplifier MOD interposed between a radio-frequency OSC and an antenna such as a dipole DI.1 or a whip antenna. They are all controlled by a synchronising-pulse generator SPG which feeds into the modulating-amplifier MOD and also into the first of eight channel-pulse generators CG.1 to CG.8. Each of the latter supplies a pulse to an associated gate-circuit G.1 to G.8 and (except for CG.8) to the next channel-pulse generator. The last channel-pulse generator CG.8 may be connected to the generator SPG for a purpose explained later. Each gate-circuit is controlled by pulse-amplitude control means PA.1 to PA.8 and does not pass a pulse to MOD unless appropriate conditions obtain at PA.1 etc., and the corresponding generator CG.1 etc., simultaneously. All the generators CG.1 to CG.8 produce pulses in correct sequence and the trains of R.F. pulses radiated are thus correctly timed, this being ensured by causing the first generator to be triggered by the trailing-edge of the synchronising pulse and causing each subsequent generator to be triggered by the trailing-edge of the pulse from the preceding generator; if the last of this train of generators feeds a trigger pulse to SPG a complete "self-locking" circuit is obtained.

An airborne receiver suitable for use with the transmitter of Figure 8 is shown in block form in Figure 9. A dipole DI.2 or whip antenna passes the received signals to a radio-frequency amplifier RF. This amplifier and a local oscillator LO feed a frequency-changer FC in conventional superheterodyne fashion to produce an intermediate-frequency wave which is amplified in IF. The intermediate-frequency wave is demodulated in two detectors DET.1 and DET.2 which are similar except that the first-mentioned is biased to respond only to the peaks of the synchronising pulses (which, it will be remembered, have a greater amplitude than those of the signal channels) and thus acts as a separator for the synchronising pulses. The second-mentioned detector acts as a normal signal-detector and preferably also feeds an automatic gain control voltage via conductor AGC to earlier stages, such as the RF stage, in well-known manner.

The synchronising pulses from DET.1 are applied to a channel-pulse generator CG.11 in the first channel. This is triggered and passes a pulse to trigger a pulse-generator CG.12 in the second channel and so on. These generators CG.11 to CG.18 are exactly the same as CG.1 to CG.8 in the transmitter. Each feeds a gate circuit G.11 to G.18 in its own channel and these gate circuits are also fed in parallel from DET.2. When any one gate G.11 to G.18 receives (simultaneously) appropriate inputs from DET.1 and its preceding pulse-generator a corresponding output circuit 0.11 to 0.18 is rendered operative.

Figure 10:
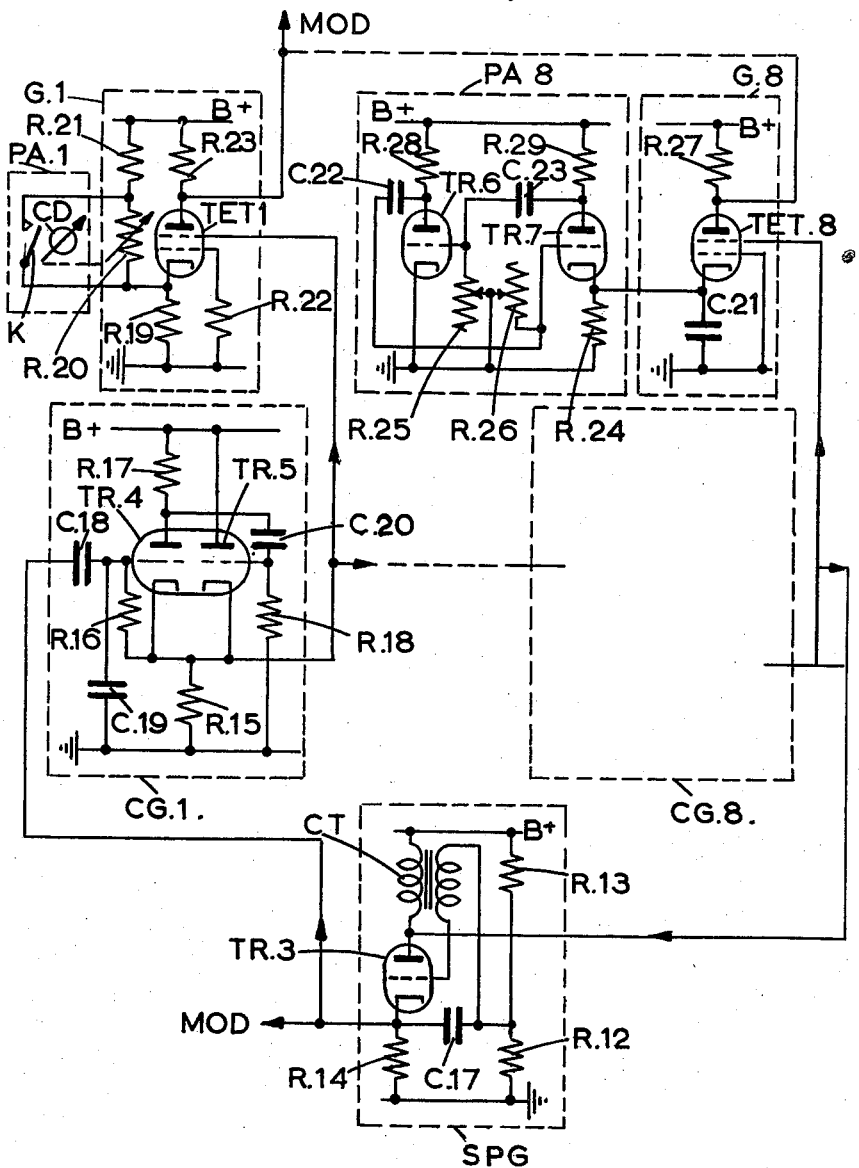
Figure 10 is a circuit diagram showing details of two of the groups of channel equipment in the transmitter of Figure 8.

Figure 10 shows the circuits of two transmitter signal-channels (assumed to be the first and last in order of multiplex timing) and of the synchronising generator SPG. The latter is a blocking-oscillator of the transformer-coupled type. Triode TR.3 has one winding of the coupling-transformer CT in its anode-circuit, the other winding being connected between the grid and one side of a capacitor C.17. This side of the capacitor is also connected to the junction point of two resistors R.12, R.13 shunted across the anode supply source, the other side being connected to the cathode end of cathode resistor R.14. When TR.3 first begins to conduct the rising anode current in the first-mentioned winding of CT causes an increasing voltage in the second of such sense (at the grid) as to assist the rise. At the same time a heavy grid current flows and builds up a cut-off bias on the capacitor C.17, which eventually stops the flow of anode current; the bias then leaks off until anode current can flow again and the cycle is repeated.

Thus, pulses of current flow in R.14 and develop pulses of voltage between the cathode and ground. These latter pulses, which have positive-going leading edges and negative-going trailing edges, are applied both to the modulating amplifier MOD and to the input of CG.1. The pulse-generator CG.1 is a trigger circuit of the kind sometimes called a one-shot multivibrator. It comprises two triodes TR.4, TR.5 (here shown as sharing a common envelope) which have a common cathode resistor R.15. The grid of TR.4, which receives pulses from SPG via capacitor C.18, is connected to ground through capacitor C.19 and to its cathode through resistor R.16. The anode load R.17 of TR.4 is connected through capacitor C.20 to the grid of TR.5, which grid is connected to ground through resistor R.18.

When no pulse is being received TR.4 is conductive and TR.5 is cut off; the arrival of a pulse does not at first change these conditions. When the trailing edge of the pulse occurs, however, the grid of TR.4 is driven negative; the resulting increase of voltage at the anode of TR.4 causes, through C.20, a positive pulse at the grid of TR.5 and TR.5 is rendered conductive. By arranging for the current in TR.5 to be appreciably higher than that previously carried by TR.4 under waiting conditions it is ensured that there is a rapid rise of current in R.15 and also a rapid cut-off of TR.4 (because the upper end of R.15 and hence the cathode of TR.4 goes more positive with respect to the negative grid of TR.4). Thus a positive-going voltage pulse appears across R.15 immediately following the end of the pulse supplied from SPG, its length being fixed by the time-constant of the grid circuit of TR.4. Each generator CG.1 to CG.7 triggers the next in the same manner. As already stated, the last generator CG.8 may be connected to SPG and for this purpose I have shown the anode of TR.3 supplied with the output pulse of CG.8. If the pulse trains are stable in time this connection is unnecessary but in the event of pulse-jitter it may be desirable to use the pulse from CG.8 as a form of quasi-synchronous trigger for SPG.

Each generator CG.1 to CG.8 is connected to the second grid of a tetrode TET.1 to TET.8 in the corresponding unit G.1 to G.8. I have shown two methods of amplitude-control in Figure 10. In the case of the first channel TET.1 is normally cut off by the cathode bias developed by resistors R.19, R.20 and R.21 connected across the anode supply, the cathode being connected to the junction of R.19 and R.20 and the first grid being connected to ground through resistor R.22. Amplitude-control is effected in PA.1 by a key K or a control device CD (such as a multi-position switch) for continuous or semi-continuous control whereby R.20 is short-circuited or altered in value respectively, thus changing the bias on the cathode of TET.1. If TET.1 is cut off by the cathode bias there is no change of voltage across the load R.23 when a pulse arrives from CG.1, but if the tetrode is rendered ready for operation by manipulation of K or CD as the case may be there will be a change of anode voltage upon the arrival of the pulse upon the second grid. A control of this form may be used for producing several depths of modulation in a signal channel or, as in the case of the key K, may be employed (as a simple on/off control) to give either zero or maximum amplitude of channel modulation.

The alternative method of amplitude-control that I have shown for channel 8 in Figure 10 is as follows. The first grid of TET.8 is grounded and the cathode thereof is connected to ground through capacitor C.21. The cathode is supplied with a rectangular switching wave from output resistor R.24 of a free-running multivibrator constituting the control unit PA.8. The multivibrator is of the anode-coupled type, i.e. each tube TR.6, TR.7 has its anode coupled to the grid of the other by a capacitor C.22, C.23 respectively and each grid is connected to ground through a resistor R.25, R.26 respectively. If C.22 and C.23 are equal in value, as is usually the case and as is assumed here, the "on" and "off" (or "mark" and "space") periods of the switching wave across R.24 are dependent solely upon the values of R.25 and R.26 and it will be seen that these are arranged to be variable jointly but in opposite senses in unit PA.8, thus providing a wide range of "mark" and "space" times. I use this control to provide a switching wave which has a constant frequency of a few cycles per second (say 5 c./s.) but with mark and space times variable as desired from (a) mark period short compared with space period, through (b) equality of mark and space periods, to (c) mark period long with respect to space period. The purpose of this control will be apparent later.

Since the multivibrator produces a rectangular wave across R.24 it will be seen that the multivibrator controls the number of pulses developed across R.27 in the anode circuit of TET.8 in response to pulses from CG.8. There is no pulse output when TET.8 is cut off by R.24; when TET.8 is prepared for operation by PA.8 the number of pulses from CG.8 that are operative depends upon the adjustment of the mark/space ratio of the multivibrator. Amplitude control is thus achieved in that pulses are either obtained from R.27 at maximum amplitude or are not permitted (zero amplitude), the relative timings of the periods of these two conditions being adjusted by R.25, R.26. The anode resistors of TR.6 and TR.7 are designated R.28 and R.29 respectively.

Figure 11:
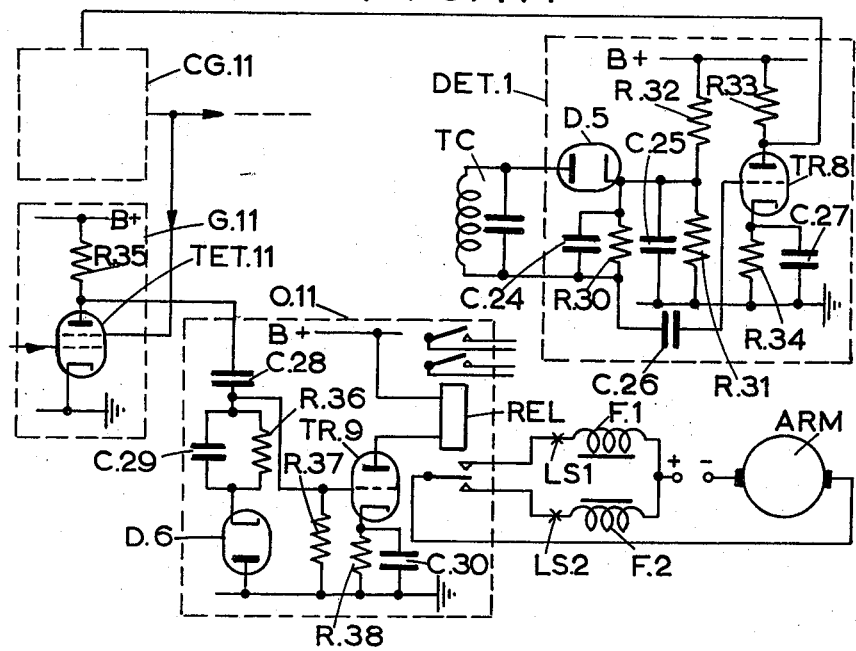
Figure 11 is a circuit diagram giving details of the receiver shown in block form in Figure 9.

Parts of the receiver shown in block form in Figure 9 are further illustrated in detail in Figure 11. Referring first to the unit DET.1, the reference TC designates the last tuned circuit in the amplifier IF which feeds both DET.1 and DET.2 as already explained. A diode D.5 with its load resistor R.30 (shunted by capacitor C.24) form a series-circuit with TC. The cathode of D.5 is given a positive bias by connection to the junction of resistors R.31, R.32 placed across the anode-supply circuit. R.31 is shunted by capacitor C.25. The amount of bias thus given to D.5 is such that this diode does not conduct unless the intermediate-frequency pulses from TC have an amplitude greater than that of the channel-pulses, i.e. D.5 gives an output pulse only when a synchronizing pulse is received. A similar diode circuit may be used in DET.2 but in this case the cathode-bias components are omitted.

Negative-going pulses from the lower end of R.30 are applied through capacitor C.26 to the grid of a triode TR.8 having an anode load R.33 and a self-bias circuit R.34, C.27. The anode-voltage pulses appearing across R.33 are transferred to the first channel-pulse generator CG.11 and this in turn triggers the next (CG.12, not shown in Figure 11) and so on. Since these generators have the same circuit as that described with reference to CG.1, Figure 10, no further explanation is required. The gate circuit G.11 comprises a tetrode TET.11, the first grid of which is connected to DET.2 as described with reference to Figure 9 whilst the second grid is supplied with pulses from CG.11. The cathode of TET.11 is grounded and its anode lead includes a load resistor R.35. The tetrode is not operative unless it receives positive pulses simultaneously on both grids, and similarly for the other gate circuits (not shown).

The anode-voltage pulses of TET.11 are transferred to the output unit O.1 and travel via capacitor C.28 and load-circuit R.36, C.29 to a diode D.6. The load-circuit is connected to the grid of a triode TR.9 which is provided with a grid resistor R.37 and a self-bias cathode circuit R.38, C.30. The connection from the anode of TR.9 to the anode-supply source includes a relay REL which may have either simple on/off contacts (as shown above, in which event this relay may be considered to be the relay RE.1 of Figure 6, for instance) or a changeover contact system (as shown below, in which case REL may be considered to be, for example, RE.4 in Figure 6).

For a simple on/off control all that is required is a change from one steady condition of TR.9 to another steady condition. At the transmitter this necessitates nothing more than the key K to be provided in the corresponding channel equipment. So long as K is operative a steady stream of pulses is radiated and the grid of TR.9 receives a steady signal at its grid. For changeover control it is necessary that the transmitter channel should send out at will one of three signals, corresponding to two alternative extreme or off-neutral positions of the changeover mechanism and a third condition in which neither of these is effective.

If the relay is of the polarized type the three conditions correspond to three signal-strengths since with a three-position, polarized changeover-relay a small current is required in the relay coil for one (off-neutral) position, a moderate current for the second (neutral) position and a large current for the third (off-neutral) position. Thus three depths of modulation must be available in the transmitter channel and a switch device is used at CD. If the changeover-relay is non-polarized and if two different current-strengths are available alternatively in the relay coil changeover is effected successfully but it is not possible to achieve a neutral position of the changeover contacts by employing an intermediate strength of current. It is for this reason that the multivibrator shown for PA.8 in Figure 10 is provided.

By adjusting the mark/space ratio of the multivibrator so that the mark period is either small or large compared with the space period the current in TR.9 changes accordingly and the relay mechanism is caused to hold in one contact-making position for a short or long time compared with the other. Referring to the actuator-control circuit shown as applied to rudder control at the extreme right of Figure 6 (RE.4 being now assumed to be a non-polarized relay operated by TR.9 in position REL), it will be seen that, since the said two contact positions correspond to opposite field polarities, the torque of the actuator-motor in one direction will be either small or large compared with the other. The motor therefore runs in one direction or the other with a torque determined by the average value of the mark/space periods; it, of course, does not reverse during the multivibrator cycle. If, now, the mark and space periods are made equal the relay mechanism will hold one contact-making position for the same time as the other, the motor will have alternately-opposite fields for equal lengths of time and the average torque will be zero. In other words, the changeover contact is given the equivalent of a neutral position by operation for equal times in opposite directions.

Figure 12:
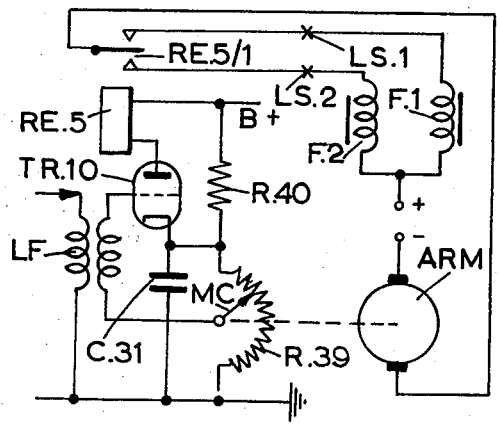
Figure 12 is a circuit diagram showing an alternative output circuit for the receiver of Figure 9.

Figure 12 shows an alternative form of output circuit. In this the signal from the gate circuit is applied to the primary of a low-frequency transformer LF, the secondary-winding of which is connected between the grid of a triode TR.10 and the moving contact MC of a potentiometer-type resistor R.39. Resistor R.39 is connected in series with a resistor R.40 across the anode-supply circuit. Triode TR.10 has its cathode connected to the junctions R.39 and R.40 and, through capacitor C.31, to ground whilst its anode is connected to a polarized relay RE.5 of the three-position, changeover type. The contacts RE.5/1 are connected to a split-field actuator-motor in the same manner as is shown in Figure 6; the motor references employed in Figure 6 are repeated in Figures 11 and 12 to obviate repetition of description but it is to be understood that these circuits are applicable to any actuator as well as to a rudder actuator.

The bias applied from R.39 to TR.10 causes this tube to act as an anode detector, i.e. it operates on the lower bend of its anode-current/grid-voltage characteristic and exhibits a change of anode current in response to a change in the applied signal. According to the strength of the signal (controlled by the depth of modulation at the transmitter, as previously explained, with the use of a device such as CD, Figure 10) relay mechanism RE.5/1 takes one of its three positions. Contact MC is linked to the actuator as conventionally indicated by a dotted line so that if the armature ARM moves in one direction or the other it shifts the said contact in such sense as to cause the bias to match the signal. In this arrangement the extent of motion of the actuator is preset and limited by the initial choice of modulation-depth.

Figure 13:
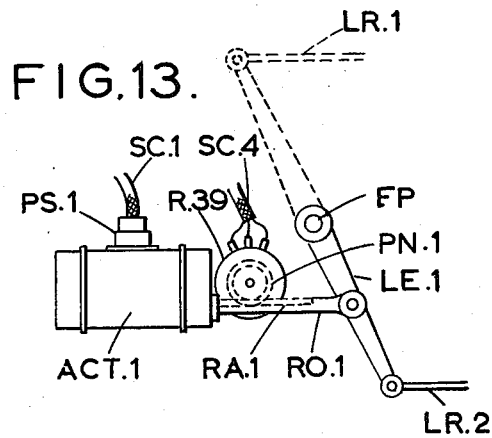
Figures 13 and 14 and 15 are views of actuators and mechanisms controlled thereby.
Figure 14:
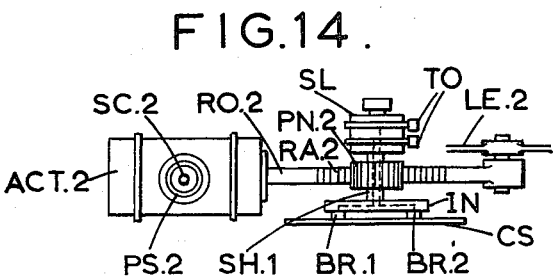
Figures 15, 16:
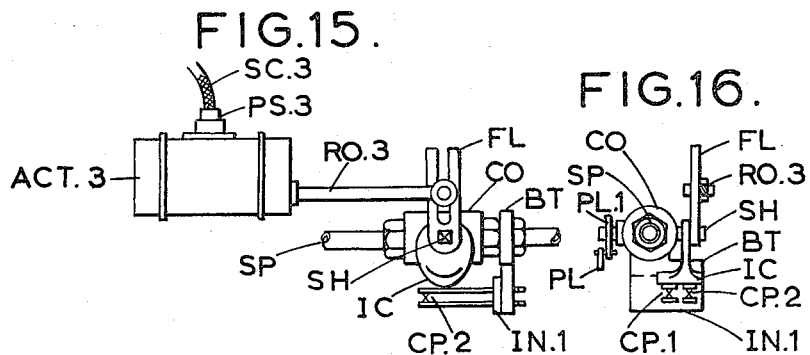
Figure 16 is a part-sectional view of the mechanism shown in Figure 15.

Actuators having a linear thrust motion are shown at ACT.1, ACT.2 and ACT.3 in Figures 13, 14 and 15 respectively; the motor supply cable SC.1, SC.2 and SC.3 from the corresponding receiver-operated relay feeds the actuator motor, through plug-and-socket couplings PS.1, PS.2, PS.3 respectively. In Figure 13 the thrust-rod RO.1 causes a lever LE.1 to move about a fixed pivot FP and thus to actuate a link-rod LR.1 or cable engaging the mechanism to be driven, e.g. a cock, aileron, rudder and so on. For a balanced drive the lever LE.1 may be made symmetrical about the pivot FP as shown in dotted lines and provided with a second link-rod or cable LR.2. A similar arrangement is adopted in Figure 14 where a lever LE.2 is partially illustrated at its connection with thrust-rod RO.2 and may be assumed to be identical with LE.1. In Figure 15 I have shown thrust-rod RO.3 engaging a forked link FL carried by a shaft SH, whereby SH is rotated as RO.3 is advanced and retracted; SH controls a spray-cock CO in spray-pipe SP. Figure 16 is a part-sectional view at right angles to the elevation of Figure 15.

With all three of these actuators I have shown how one and the same thrust rod may perform two or more operations. Thus, in Figure 13 the rod RO.1 not only operates lever LE.1 but also drives, through rack-teeth RA.1, a pinion PN.1 carried by the contact-arm MC of the resistor R.39 of Figure 12. Reference SC.4 designates the cable connecting R.39 into the circuit of TR.10. In Figure 14 I have shown how the rod RO.2 may be employed to drive the brushes BR.1, BR.2 of Figure 6. These brushes are here shown as carried by an insulator IN from a shaft SH.1 which is rotated by pinion PN.2 engaging rack-teeth RA.2 on RO.2. Shaft SH.1 also carries a slip-ring unit SL engaged by take-off brushes TO. Connection is made to SL from BR.1 and BR.2 by conductors running through IN and SH.1 as shown in dotted lines.

Figures 15 and 16 show how RO.3 may be used to operate contact pairs CP.1, CP.2 (which are employed in substitution for the contacts RE.1/1 and RE.1/2 of Figure 6) and pawl PL, thus rendering relay RE.1 unnecessary. It has been indicated above that when RE.1 is employed this requires different timing as compared with the relay controlling the actuator for the spray-cock, thus involving circuit complexity, and perhaps even the need for an additional radio-channel. This difficulty is obviated by causing RO.3 to control not only the spray-cock CO but also CP.1, CP.2 and PL. For this purpose CP1, CP.2 are carried by insulator IN.1 from bracket BT on the body of the cock and are engaged by an insulated cam IC driven by SH, whilst PL is carried on a support PL.1 also driven by the same shaft. The contact-pairs CP.1, CP.2 are closed and PL operates to advance CS (not shown in Figure 16) when cock CO is opened.

Since in accordance with my invention a pilot is no longer carried by the spraying aircraft it is possible to make advantageous changes in the aircraft structure by omitting part or all of the conventional fuselage and utilising the container or containers for spray-medium and fuel to take its place, either partially or wholly, in the support of wings, rudder, radio equipment and so on.

Thus in Figures 17 and 18 I have shown a helicopter in which the normal fuselage is replaced by a substantially-ellipsoidal tank EC which is divided by a horizontal partition HP to provide an upper container EC.1 for aircraft fuel and a lower container EC.2 for spray-medium. Riser pipes RP.1, RP.2 run from these containers to pumps enclosed, along with other mechanism, in a housing HO in the form of a truncated cone. The containers are filled through filler-spouts FS.1, FS.2 respectively. The tank EC is welded at its lower periphery to a tubular-metal frame MF to which is attached a landing bag LB in the form of a toroidal rubber tube inflated with air. Also welded to tank EC are (Figure 17, side elevation) a boom or outrigger OR to provide at OR.1 pivotal support for a rudder RU and (Figure 18, front elevation) spray booms B.

The spray booms B, which are omitted from Figure 17 for the sake of simplicity, differ slightly according to whether spraying is effected by nozzles or brushes. Both forms are shown in Figure 18. In the right-hand half of the figure the lower part of boom B supports a set of spray-nozzles SN whilst the left-hand half of the figure shows the boom supporting a spray-brush SB which rotates during flight. The booms are at least partly made of tubular metal so that they act as feed-pipes in well-known manner. These alternative constructions differ in no way from those used with piloted aircraft. The feed to the boom from its associated pump (see Figure 19) is effected through pipe BF.

The radio-control receiver Rx (and in addition the receiver for automatic course-maintenance, if used) is mounted near the tank EC on boom OR and above it projects its antenna, here shown as a whip antenna WA, although a dipole may be employed if desired as already stated above.

The rotor head of the helicopter, designated generally RH, is of the type driven by tip-mounted ram-jets RJ on the lift-wings 2, of which there are two. Interposed between these wings there are two control blades 3. The mechanism for these wings and blades is shown in perspective in Figure 19 and will be seen to be essentially the same as that disclosed in United States Patent No. 2,631,679, granted to Stanley Hiller, Jr., and Harold H. Sigler. The lower portion of this mechanism is normally enclosed in housing HO, which has been omitted from Figure 19. All the mechanism is carried by base-plate BP which forms the upper boundary of the tank EC.

A full description of the rotor head will be found in the aforesaid Patent No. 2,631,679 and I will describe here only the more-important features of construction to facilitate an understanding of the adaptations made for the purpose of remote radio control in accordance with my invention. Reference numerals occurring in the said patent will be used to assist comparison; references not occurring therein incorporate letters.

Rotor column 4, in the form of a hollow shaft rotating about its axis, is supported by struts 6 secured to a sleeve 7 through which rotor shaft 4 extends. Below sleeve 7 the shaft 4 engages a pulley 34 which I use to drive an electric generator EG and two pumps PU.1, PU.2 for fuel and spray-medium; these latter are fed from riser pipes RP.1, RP.2. Fuel is supplied from PU.1 to jet motors RJ through shaft 4 in the manner described in the aforesaid patent, whilst spray-medium is fed from PU2 to BF. Above the sleeve 7 the rotor shaft 4 is embraced by a wobble mechanism comprising a first ring 52, which does not rotate but has its plane of inclination altered to effect cyclic pitch control, and a second ring 58 which both rotates and tilts.

I modify the ring 52 as compared with the disclosure in United States Patent No. 2,631,679 by providing it with two controls for adjustment of tilt. Figure 19 illustrates two linear actuators LA.1, LA.2, each being electrically driven by a reversible split-field motor as hereinbefore described. The thrust rods RO.4, RO.5 of these actuators are pivotally connected to ring 52 as shown at PC in Figure 19 in the case of RO.4; the other connection is not visible in Figure 19 but see Figure 17. One actuator LA.1 controls the tilt corresponding to forward or rearward movement of the aircraft whilst the other controls the tilt corresponding to sideward movement thereof; any combination of joint longitudinal and lateral control is obtainable by simultaneous operation. Both these actuators are controlled by radio-control from the remote point V or P, their motors being caused to rotate in the correct directions by relay control as already explained (see Figures 11 and 12). They are pivotally mounted on base-plate BP.

Shaft 4 terminates at the top in a two-pronged fork of which one prong is visible at 66. Trunnion pins 67 fixed to the prongs provide pivotal support for a spider 68 in which is journalled shafting 72 carrying the control blades 3. Shafting 72 is also journalled in a hub 76 which carries the lift wings 2. Collective pitch control is permitted by the provision of trunnions 81 on hub 76 for engagement by hollow mounting shafts 83 at the inner ends of these wings, the adjustment of the wings being obtained by axial movement of shaft 88 which extends through rotor shaft 4, through spider 68, and through a sleeve 92 carried by a bracket 93 secured to a hub 76. A the top, shaft 88 is connected to a pair of push rods 94 which in turn connect to the shafts 83 at 96.

In adapting this shaft-control of collective pitch I place the lower end of shaft 88 in a footstep bearing FB pivotally mounted at FB.1 at the end of a lever LE.3 pivoted intermediate its ends in brackets BK. The end of LE.3 remote from the bearing FB is engaged by linear-thrust actuator LD which is pivotally mounted on BP. Operation of LD thus raises or lowers shaft 88 to control the collective pitch. The lever LE.3 is linked at LL to a further linear actuator LG which controls the position of a pivoted fork PF relative to LE.3. The components LE.3, LL, LG and PF move together in response to actuation of LD but the fork PF can be adjusted with relation to LE.3 by operation of LG. The fork PF is connected by Bowden cable BC and link BL to fuel valve FV acting as a throttle. As the collective pitch is changed to cause the aircraft to rise and thus to demand more fuel the throttle FV is automatically opened; similarly FV moves towards the closed position as the aircraft descends. To compensate for changes in conditions, for instance change in loading as the spray-medium is used, LG permits the rotor speed to be adjusted independently of the collective-pitch lever LE.3.

Reverting to the cyclic-pitch control, links 98 are pivotally connected at 99 to the ring 58 and are in turn pivotally connected at 102 to links 103. Each link 103 is anchored by universal connection at 104 to a feedback lever 106 connected by universal joint 107 to hub 76 at its inner end and by universal joint 111 to link 112 at its outer end. The links 112 are pivotally connected at 113 to shafting 72.

The rotor is first caused to revolve (for take-off) by any of the usual means and the ram-jets RJ started. The throttle FV is next remotely controlled by the radio-transmitter to achieve correct rotor-speed and the actuator LD then operated to cause the aircraft to rise by collective pitch-control through 88. The course is set by actuators LA.1, LA.2 controlling the cyclic-pitch mechanism and by a rudder actuator which may be placed as shown in Figure 17 and may be that shown in Figure 14 if the airborne radio equipment includes course-maintenance equipment as described with reference to Figures 4 and 6; the references ACT.2, LE.2 and LR.1 have the same significance as in Figures 13 and 14. If the course-maintenance equipment is not employed the brush-drive mechanism shown in Figure 14 will, of course, be omitted. Actuators LA.1, LA.2 and ACT.2 are responsible also, under remote radio control, for turns at the boundaries of the field. In addition to the four actuators shown in Figure 19 and the rudder-actuator shown in Figure 17 I require a sixth for control of the spray-medium; this is not shown in Figures 17 to 19 but a sufficient description has been given with reference to Figures 15 and 16; here also simplification can be effected if the course-maintenance equipment of Figures 5 and 6 is omitted. Thus a minimum of six radio-control channels is needed.

The spray-cock actuator of Figures 15 and 16 and the throttle FV may conveniently be carried on the plate BP in the vicinity of the pumps PU.1, PU.2 but are not shown there for the sake of clarity. The throttle valve and the spray-cock are of course included in the pipe lines from their respective pumps to control the delivery of fuel and spray medium to the rotor head and spray booms respectively in conventional manner.

The supply of fuel to the rotor head may be controlled by a centrifugal governor of known design, in which event the actuator LG need not be coupled to PF but will operate FV directly since FV then forms an on/off control for emergency purposes.

Generator EG supplies power to the receiver Rx, the actuators, and the course-maintenance equipment if used.

I normally prefer to employ a helicopter but in some cases I may more conveniently make use of a fixed-wing aircraft. In this instance also the container or containers for fuel and spray medium advantageously form an important part of the structure, for example, as shown in Figure 20, which is an inverted plan of a biplane built round a rectangular tank TA which is provided with a vertical partition VP to form a forward container TA.1 for fuel and a rearward container TA.2 for spray medium. The front wall of TA supports an engine EN driving propeller PR. Upper wings UW.1, UW.2 and lower wings LW.1, LW.2 are carried at the top and bottom of the tank TA and are additionally braced by struts ST. The tips of the wings are provided with spill-plates SP.

An undercarriage UC and spray-booms B fitted with nozzles SN are carried below the wings LW.1, LW.2 and an outrigger OU.1 supports tail-structure TS which includes elevator flaps EF and rudder RU.1. Aileron flaps AF are provided on the wings. Pumps similar to PU.1 and PU.2 of Figure 19 and an electric generator similar to EG of that illustration may be housed in the rear section EN.1 of the engine to facilitate driving thereby in well-known manner. The receiver R*x* and associated actuators of the type already described and illustrated are housed in a compartment CP at the rear of tank TA; by way of example I have illustrated rods or cables LR.4, LR.5 and LR.6 running from actuators in this compartment to the rudder, elevators and aileron-flap levers AF.1 respectively, which rods or cables may be considered identical in construction and operation with those already shown in Figure 13. In addition to those for the rudder, elevators and ailerons I require, of course, actuators for the throttle and the spray-cock.

I have already described in detail an arrangement for the maintenance of courses which relieves the operator at V of a part of his control duties. Another instance in which his work may be advantageously reduced is maintenance of correct flying-height. So long as the field F being sprayed is flat and level there is no great difficulty in maintaining correct height by remote operator-control but if the field is irregular and/or slopes the task of the operator may be rendered quite burdensome and I therefore now describe two alternative expedients to permit automatic control of height.

Referring first to Figure 21, this shows the mechanical components of an electro-mechanical height-control applied to the helicopter of Figures 17 and 18. As shown, a forwardly-extending outrigger OU.2 carries a rearwardly-bent arm RA.3 on the lower end of which a pivot RA.4 supports a wheel WH. In the position shown in full lines, the flight position, the wheel WH is below and in advance of the helicopter proper; the distance below the helicopter sets the height of the spray-booms B and is adjusted by alteration of the strength of a helical spring HS pivotally connected at HS.1 and HS.2 to the arm RA.30 and the outrigger OU.2 respectively. Spring HS keeps the wheel in balance so long as it is at correct distance and in light contact with the ground; if the wheel leaves the ground or is engaged firmly therewith due to change of ground-level, the arm RA.3 is swung about the pivot PV by which it is connected to OU.2. In normal flight the wheel WH is sufficiently in advance of the helicopter to give enough time for alteration of height following detection of a change in ground-level.

Change of height following the said detection is accomplished by the control shown in Figure 22. The pivot PV extends from a switch casing CA at the extreme end of OU.2 and a part of the arm RA.3 surrounds and turns on the pivot within the casing. This part of the arm, the pivot PV and the casing CA are shown in section in Figure 22. Carried on the said part is a moving contact CN.1 adapted to engage, according to the direction of movement of RA.3, one of two contacts CN.2, CN.3 on an insulating plate IP fixed to the casing CA. It also engages a fixed contact CN.4 on plate IP of wider extent than CN.2 and CN.3. The contact CN.1 is insulated from RA.3 by insulating block IB. Plate IP can be adjusted relatively to the pivot; for this purpose it is provided with arcuate slots AS through which fixing screws FS extend into the casing CA.

Plate IP is adjusted when spring HS is adjusted so that for correct flying height contact CN.1 is out of contact with both CN.3 and CN.3. If arm RA.3 moves more than a predetermined small amount CN.1 connects CN.4 to either CN.2 or CN.3 as the case may be. Contact CN.4 is connected to the armature ARM of the actuator LD, Figure 19, whilst the contacts CN.2 and CN.3 are connected to the field coils F1, F2 of the said actuator. The actuator is thus driven to adjust the collective-pitch mechanism in the correct direction to alter the height of the aircraft.

A radio-controlled relay RE.6 of the changeover type is employed to permit the aircraft to take-off and land; when landed wheel WH is in the dotted-line position of Figure 21 and contact CN.1 has travelled beyond the fixed contacts CN.2, CN.4. This relay RE.6 is of the polarized type and has two three-position contacts RE.6/1 and RE.6/2. When the lower contact RE.6/2 is in the neutral position shown the upper RE.6/1 is in its one operative position as shown, i.e. completing the circuit from CN.4 to the armature ARM. When the relay current is changed so that RE.6/2 engages either of its fixed contacts to close the motor circuit the contact RE.6/1 opens the circuit from CN.4. Thus the radio operator can effect take-off and landing and also take over control at any time, using a three-position radio channel as above described.

The other expedient for the maintenance of height that I will now describe with reference to Figures 23 to 25 comprises the employment of a modified capacitance altimeter. The principle of this will first be explained. An aircraft AF carries two insulated conductors IA.1, IA.2 (Figure 23) spaced apart either laterally or fore-and-aft. When the aircraft AF is remote from the ground these conductors, e.g. plates, have mutual capacitance CA.1 and each of them has capacitance CA.2, CA.3 respectively to the aircraft structure; these three capacitances are dependent solely upon the characteristics of the assembly of aircraft and conductors. When the aircraft approaches the ground three variable capacitances have to be taken into account; CA.4 from IA.1 to ground, CA.5 from aircraft to ground, and CA.6 from IA.2 to ground. These three may be effectively replaced, however, by a varying capacitance CA.7 in parallel with CA.1. A bridge BD connected between IA.1 and IA.2 can be used to balance out CA.1 and measure CA.7. Capacitances CA.2 and CA.3 are taken care of in setting up the bridge and may be ignored.

A known bridge for measuring CA.7 whilst balancing out CA.1 is shown in Figure 24. One winding of an audio-frequency transformer AT.1 is supplied with a constant-amplitude A.F. wave from source SO. The other winding of this transformer is connected in series with one winding of a transformer AT.2 and a capacitor C.40 which balances the capacitance CA.1. The other winding of AT.2 is connected to a balance-detector PH which is phase-sensitive and which receives a reference-wave from SO through phase-shifter PHS. For measurement purposes balance-detector PH feeds a meter calibrated in heights.

In my adaptation of the bridge I use a balance-detector type of circuit to provide a control-current for operation of height-maintenance means. Thus in Figure 25 I have shown a balance-detector which includes a triode TR.11 feeding an anode-transformer AT.3 of the split-secondary type. The two ends of the secondary of AT.3 are connected to diodes D.7, D.8 and the mid-point to the junction of the diode-loads R.41, C.41 and R.42, C.42. The connection from the mid-point includes the secondary winding of a transformer AT.4 the primary of which is fed from the phase-shifter PHS. The voltage across the diode loads is fed to a triode TR.12 which has a variable cathode-resistor R.43 and acts as a D.C. amplifier. The phase of the wave supplied to AT.4 and the value of current flows in the anode circuit of TR.12 for a predetermined value of CA.7, i.e. height. Any departure in flight from this value results in a change of anode current.

The anode circuit of TR.12 includes one winding of each of two differentially-wound polarized relays RE.7, RE.8. The two other windings thereof are connected, in series with a variable resistor R.44, across the anode-supply source. Resistor R.44 is adjusted so that, for the predetermined height, the current in the second-mentioned pair of relay windings produces fields which balance those caused by anode current in the first-mentioned pair. At the pre-set height, therefore, neither relay operates. If the height changes the value of CA.7 alters and the current in TR.12 is varied accordingly because the magnitude of the voltage across the diode resistors R.41, R.42 is changed. Variation in anode current in TR.12 causes either RE.7 or RE.8 to operate, depending upon the sign of the variation. This is achieved by making the anode-current coils of RE.7 and RE.8 produce opposite effects, i.e. one of them is wound in such sense that an increase in current therein causes it to become operative whilst the other is wound so that a decrease in current therein causes the associated differential coil to become operative. In other words, if each relay has two similar coils, one relay is energised when the anode-current coil has a greater current than the differential coil and the other is energised when the differential coil has a greater current than the anode-current coil.

The two contacts RE.7/1 and RE.8/1 of the said relays are connected to the field coils F.1, F.2 of an actuator motor having armature ARM. In the case of the helicopter previously described this actuator is that designated LD in Figure 19. The circuit includes a relay RE.6 for the purpose explained with reference to Figure 22. In the case of the aircraft shown in Figure 20 (which figure includes the conductors IA.1, IA.2 and the bridge BD) the actuator controlled by RE.6, RE.7 and RE.8 is that connected by LR.5 to the elevators EF.

In the modified form of helicopter shown in Figure 26 the landing-bag LB is replaced by skids SK. The other references have the same significance as before.

The two forms of aircraft described above have been shown as fitted with booms for dispensing the spray medium. In the case of seeds, granular material and the like I prefer to use a hopper-fed venturi-dispenser of known type. This is more readily applicable to a fixed-wing aircraft and a modified form of the aircraft of Figure 20 is shown so fitted in Figure 27. This has a fuselage FU housing a hopper HR which at its lower end feeds into a venturi-dispenser VD through an adjustable slide-valve SV. This valve is operated from actuator SV.1 via levers SV.2.

What I claim is:

1. Aerial-spraying apparatus comprising a pilotless spraying aircraft, controllable means for the delivery of spray carried by said aircraft, normally-operating means controlling the aircraft course automatically, normally-inoperative non-automatic means for control of aircraft course, a first radio-receiver in said aircraft responding to signals from a pair of space coordinated radio transmitters forming a hyperbolic field and forming therewith a navigation-aiding system, and a second radio-receiver in said aircraft responding to signals from a remote-control radio-transmitter, said first receiver controlling the normally-operative course-control means whereby the aircraft follows said hyperbolic field and said second receiver adjusting said controllable spray-delivery means and substituting said non-automatic course-control means for said automatic course-control means in response to signals radiated from said remote-control transmitter.

2. Aerial-spraying apparatus comprising a pilotless spraying aircraft, controllable means for the delivery of spray carried by said aircraft, a first course-control mechanism in said aircraft for bringing the aircraft at least approximately on to each of a series of substantially-parallel courses in succession, a second course-control mechanism in said aircraft for holding the aircraft automatically on course when brought thereto by said first course-control mechanism, and a radio-receiver in said aircraft which is responsive to signals from a remote-control radio transmitter and which develops output signals applied to said controllable means, said output signals effecting adjustment of said controllable means and effecting substitution of said first course-control mechanism for said second course-control mechanism at the end of each successive course.

3. Aerial-spraying apparatus as specified in claim 2 with the addition of a second radio-receiver in said aircraft which responds to signals from a pair of spaced transmitters forming a hyperbolic field, said second radio-receiver developing output voltages for the control of said second course-control mechanism to operate said aircraft along substantial parallel lines of said field.

4. Aerial-spraying apparatus comprising a pilotless spraying aircraft, a supply container for a spray-medium disposed within said aircraft, means for dispensing said medium in communication with said container, controlling means operatively connected to said dispensing means for governing the flow of said medium, speed means for controlling the speed of said aircraft, direction means for controlling the direction of flight of said aircraft, height means for controlling the height of said aircraft above the ground, radio-receiver means connected to said controlling means, said speed means, said direction means and said height means to operate and control the flight of said aircraft and control the periodic flow of said spray-medium, said radio-receiver being responsive to signals from a radio-transmitter situated on the ground, and height measuring means in said aircraft comprising a ground engaging feeler extending forwardly from said aircraft, means actuated by said feeler to control said height means, and electrical means for rendering the height measuring means inoperative in response to signals from said radio-receiver.

5. Aerial-spraying apparatus comprising a pilotless spraying aircraft, a supply container for a spray-medium disposed within said aircraft, means for dispensing said medium in communication with said container, controlling means operatively connected to said dispensing means for governing the flow of said medium, speed means for controlling the speed of said aircraft, direction means for controlling the direction of flight of said aircraft, height means for controlling the height of said aircraft above the ground, radio-receiver means connected to said controlling means, said speed means, said direction means and said height means to operate and control the flight of said aircraft and control the periodic flow of said spray-medium, said radio-receiver being responsive to signals from a radio-transmitter situated on the ground, and height measuring means comprising a capacitance altimeter, means adjusting said height means in response to signals from said altimeter to maintain said aircraft at a predetermined level, and means responsive to signals from said radio-receiver for rendering said height measuring means inoperative.

References Cited in the file of this patent

UNITED STATES PATENTS

| | | |
|---|---|---|
| 2,397,475 | Dinga | Apr. 2, 1946 |
| 2,479,549 | Ayres et al. | Aug. 23, 1949 |
| 2,537,251 | Wilson | Jan. 9, 1951 |
| 2,583,884 | Ripper et al. | Jan. 29, 1952 |
| 2,620,148 | Baring-Gould et al. | Dec. 2, 1952 |
| 2,659,556 | Doblhoff | Nov. 17, 1953 |
| 2,674,820 | Hansen et al. | Apr. 13, 1954 |
| 2,709,773 | Getting et al. | May 31, 1955 |
| 2,784,402 | White et al. | Mar. 5, 1957 |

FOREIGN PATENTS

| | | |
|---|---|---|
| 728,025 | Germany | Nov. 18, 1942 |